(12) United States Patent
Naka

(10) Patent No.: US 10,718,376 B2
(45) Date of Patent: Jul. 21, 2020

(54) WHEEL BEARING DEVICE

(71) Applicant: NTN CORPORATION, Osaka-shi, Osaka (JP)

(72) Inventor: Daisuke Naka, Iwata (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 16/344,905

(22) PCT Filed: Oct. 27, 2017

(86) PCT No.: PCT/JP2017/038873
§ 371 (c)(1),
(2) Date: Apr. 25, 2019

(87) PCT Pub. No.: WO2018/079703
PCT Pub. Date: May 3, 2018

(65) Prior Publication Data
US 2019/0257353 A1 Aug. 22, 2019

(30) Foreign Application Priority Data

Oct. 28, 2016 (JP) ................................. 2016-212360

(51) Int. Cl.
*F16C 19/18* (2006.01)
*B60B 27/00* (2006.01)
(Continued)

(52) U.S. Cl.
CPC ........ *F16C 19/183* (2013.01); *B60B 27/0005* (2013.01); *B60B 27/0094* (2013.01);
(Continued)

(58) Field of Classification Search
CPC ........ F16C 19/18; F16C 19/183; F16C 33/76; F16C 41/00; F16C 41/007
See application file for complete search history.

(56) References Cited

U.S. PATENT DOCUMENTS 8,777,491 B2* 7/2014 Wang ................. B60B 27/0005
384/480
9,796,212 B2 10/2017 Nakamura
(Continued)

FOREIGN PATENT DOCUMENTS

CN       102143849     8/2011
JP       2009-097660   5/2009
(Continued)

OTHER PUBLICATIONS

International Search Report dated Jan. 16, 2018 in International (PCT) Application No. PCT/JP2017/038873.
(Continued)

*Primary Examiner* — James Pilkington
(74) *Attorney, Agent, or Firm* — Wenderoth, Lind & Ponack, L.L.P.

(57) ABSTRACT

A wheel bearing device equipped with: an inner member including an outer ring (2), a hub ring (3), and at least one inner ring (4) press-fitted into the hub ring (3); multiple rows of rolling bodies (5a/5b); a magnetic encoder (9) provided on an end portion of the inner ring; a cover (10) fitted onto the outer ring (2); and a magnetic sensor (11) provided on the cover. The cover includes a large-diameter cylindrical section (10a) fitted onto the outer ring, a step section (10b) protruding toward the inside in the radial direction and contacting an end surface of the outer ring, and a small-diameter cylindrical section (10c) extending in the axial direction from the step section. A portion of the ground-surface side of the small-diameter cylindrical section forms a protruding circumferential surface (S), and a drain hole (10e) is formed in the protruding circumferential surface (S).

5 Claims, 5 Drawing Sheets

(51) Int. Cl.
*F16C 33/76* (2006.01)
*F16C 41/00* (2006.01)
*B60B 35/14* (2006.01)
*B60B 35/18* (2006.01)

(52) U.S. Cl.
CPC .............. *B60B 35/14* (2013.01); *B60B 35/18* (2013.01); *F16C 33/76* (2013.01); *F16C 41/00* (2013.01); *F16C 41/007* (2013.01); *F16C 2326/02* (2013.01)

(56) References Cited

U.S. PATENT DOCUMENTS

| | | |
|---|---|---|
| 9,815,328 B2 | 11/2017 | Kaneko |
| 2012/0281939 A1 | 11/2012 | Nakamura et al. |
| 2015/0078691 A1 | 3/2015 | Nakamura |
| 2015/0147013 A1 | 5/2015 | Kaneko |

FOREIGN PATENT DOCUMENTS

| | | | |
|---|---|---|---|
| JP | 2011-079512 | | 4/2011 |
| JP | 2013-100855 | | 5/2013 |
| JP | 2014-129880 | | 7/2014 |
| WO | WO2009139179 | * | 11/2009 |
| WO | 2011/043266 | | 4/2011 |

OTHER PUBLICATIONS

Chinese Office Action dated Apr. 21, 2020 in corresponding Chinese Patent Application No. 201780066342.5 with English translation.

\* cited by examiner

WHEEL BEARING DEVICE

BACKGROUND OF THE INVENTION

1. Technical Field

The present invention relates to a wheel bearing device and, more particularly, to a wheel bearing device including a rotational speed detector.

2. Description of the Related Art

Conventionally, there has been known a wheel bearing device that rotatably supports a wheel in a suspension device of a vehicle or the like and includes a rotational speed detector for detecting the rotational speed of the wheel. The wheel bearing device has a hub race connected to a wheel so as to be rotatably supported through rolling elements. The rotational speed detector is configured by a magnetic encoder alternately magnetized to different magnetic poles in the circumferential direction and a magnetic sensor. The wheel bearing device has the magnetic encoder fixed to a hub race, and the magnetic sensor disposed on a portion that does not rotate integrally with the hub race. The wheel bearing device can detect the rotational speed of the wheel connected to the hub race from the intervals of change in magnetism when the magnetic encoder integrally rotating with the hub race passes near the magnetic sensor. Some wheel bearing device protects the magnetic encoder with a cover to prevent erroneous detection caused by damage to the magnetic encoder due to flying stones and the like and the adhesion of dirt, a magnetic substance, and the like. The magnetic encoder is hermetically sealed inside the outer race of the wheel bearing device by covering the opening portion of the outer race with a cover made of a nonmagnetic material. For example, JP-A 2014-129880 discloses such a wheel bearing device.

The wheel bearing device disclosed in JP-A2014-129880 has a magnetic encoder constituting a rotation detection sensor unit (rotational speed detector) fixed to a one-side end portion of a hub race. A cylindrical cover is fitted on the opening portion of the outer race facing the detection surface of the magnetic encoder. The cover is formed of a large-diameter cylindrical portion to be fitted to the outer race, a small-diameter cylindrical portion provided with a sensor and a drainage hole, and a stepped portion connecting the large-diameter cylindrical portion and the small-diameter cylindrical portion. The position of the cover in the axial direction is determined by bringing the stepped portion into contact with the end face of the outer race. A sensor (magnetic sensor) constituting the rotation detection sensor unit is provided on the small-diameter cylindrical portion. Further, a drainage hole (drain hole) is formed in the small-diameter cylindrical portion. A disk portion of the cover is formed at one axial end of the small-diameter cylindrical portion through a bent portion, and a stepped portion is formed at the other axial end of the small-diameter cylindrical portion through the bent portion. That is, the range in which the axial width of the drainage hole can be formed in the small-diameter cylindrical portion is limited by the disk portion and the stepped portion. Accordingly, the cover of the wheel bearing device needs to be increased in size in the axial direction to increase the axial width of the drainage hole.

SUMMARY OF THE INVENTION

1. Technical Problems

The present invention has been made in view of the above circumstances and an object thereof is to provide a wheel bearing device that can improve foreign substance discharging property of a drain hole without increasing a size of the cover in an axial direction.

2. Solutions to the Problems

That is, a wheel bearing device includes an outer member having double-row outer raceway surfaces integrally formed on an inner periphery and fixed to a vehicle body, an inner member including a hub race that integrally has, on one end portion, a wheel attaching flange for attachment of a wheel and a small-diameter stepped portion extending on an outer periphery in an axial direction and at least one inner race that is press-fitted in the small-diameter stepped portion and having double-row inner raceway surfaces formed on an outer periphery so as to face the double-row outer raceway surfaces, double-row rolling elements rollably housed between the inner raceway surfaces and the outer raceway surfaces, a magnetic encoder provided at an inner side end portion of the inner member, a cylindrical cover fitted in an inner side opening portion of the outer member, and a magnetic sensor provided in the cover with a detection unit facing the magnetic encoder. The cover includes a large-diameter cylindrical portion to be fitted to the outer member, a stepped portion protruding radially inward from an end of the large-diameter cylindrical portion and brought into contact with an end face of the outer member, and a small-diameter cylindrical portion extending from the stepped portion in the axial direction. A portion of the small-diameter cylindrical portion which is located on a ground side protrudes radially outward so as to form a protruding circumferential surface having a circular arc shape with a radius equal to a radius of the large-diameter cylindrical portion. A drain hole is formed in the protruding circumferential surface.

The wheel bearing device is configured such that the protruding circumferential surface is formed at each of opposing positions on an upper side and a lower side of the cover, and the drain hole is formed in each of the protruding circumferential surfaces.

The wheel bearing device is configured such that a plurality of the protruding circumferential surfaces are formed, and the magnetic sensor is provided on one of the protruding circumferential surfaces on which the drain hole is not formed.

The wheel bearing device is configured such that the protruding circumferential surface is formed to have a predetermined width in a circumferential direction, and the drain hole is formed into a long hole extending in the circumferential direction.

3. Advantageous Effects of the Invention

The present invention has the following effects.

That is, according to the wheel bearing device, the axial width of the portion of the circumferential surface of the cover in which the drain hole is formed is not limited by the stepped portion. This can improve the foreign substance discharging property of the drain hole without increasing the size of the cover in the axial direction.

According to the wheel bearing device, a right and left dual-purpose part is formed by newly forming a portion where no stepped portion is formed. This can improve the foreign substance discharging property of the drain hole without increasing the size of the cover in the axial direction.

According to the wheel bearing device, the magnetic sensor is disposed on a portion which does not overlap the drain hole. This can improve the foreign substance discharging property of the drain hole without increasing the size of the cover in the axial direction.

According to the wheel bearing device, the position and width of the drain hole in the circumferential direction are arbitrarily set. This can improve the foreign substance discharging property of the drain hole without increasing the size of the cover in the axial direction.

DETAILED DESCRIPTION OF EMBODIMENTS

A wheel bearing device 1 according to the first embodiment will be described below with reference to FIGS. 1 and 2.

Figure 1:
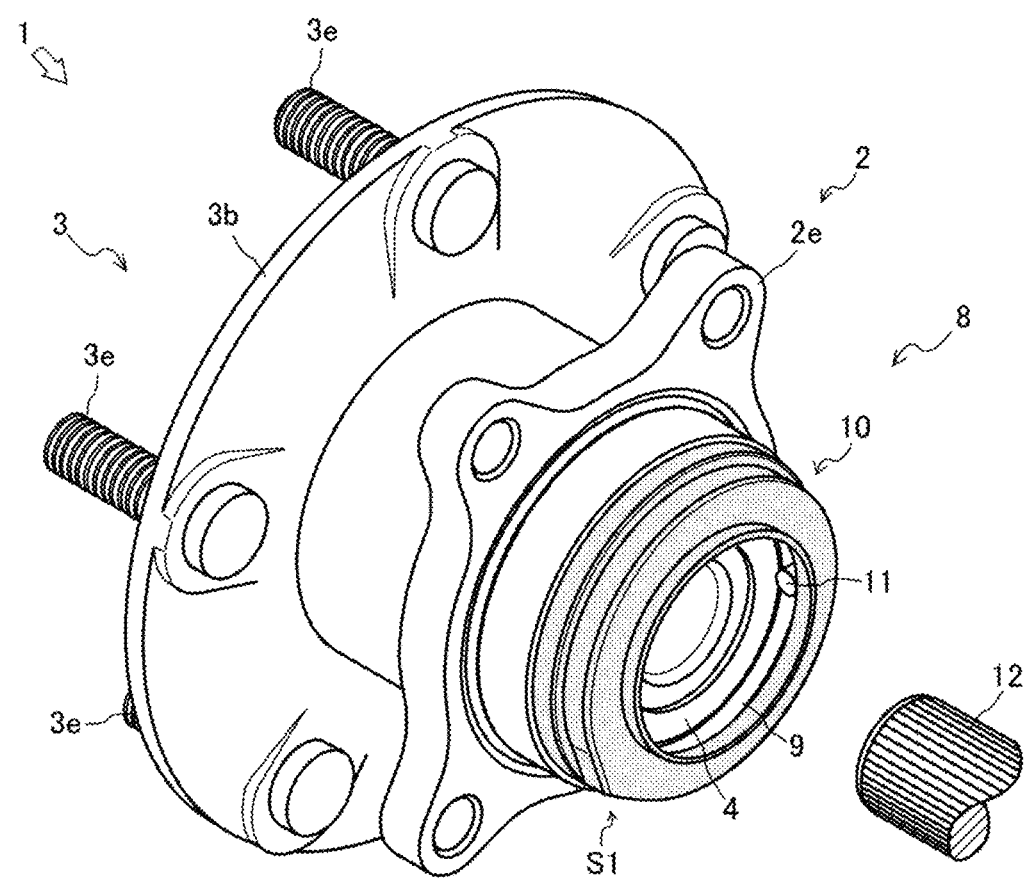
FIG. 1 is a perspective view showing an overall arrangement of a wheel bearing device according to a first embodiment of the present invention.
Figure 2:
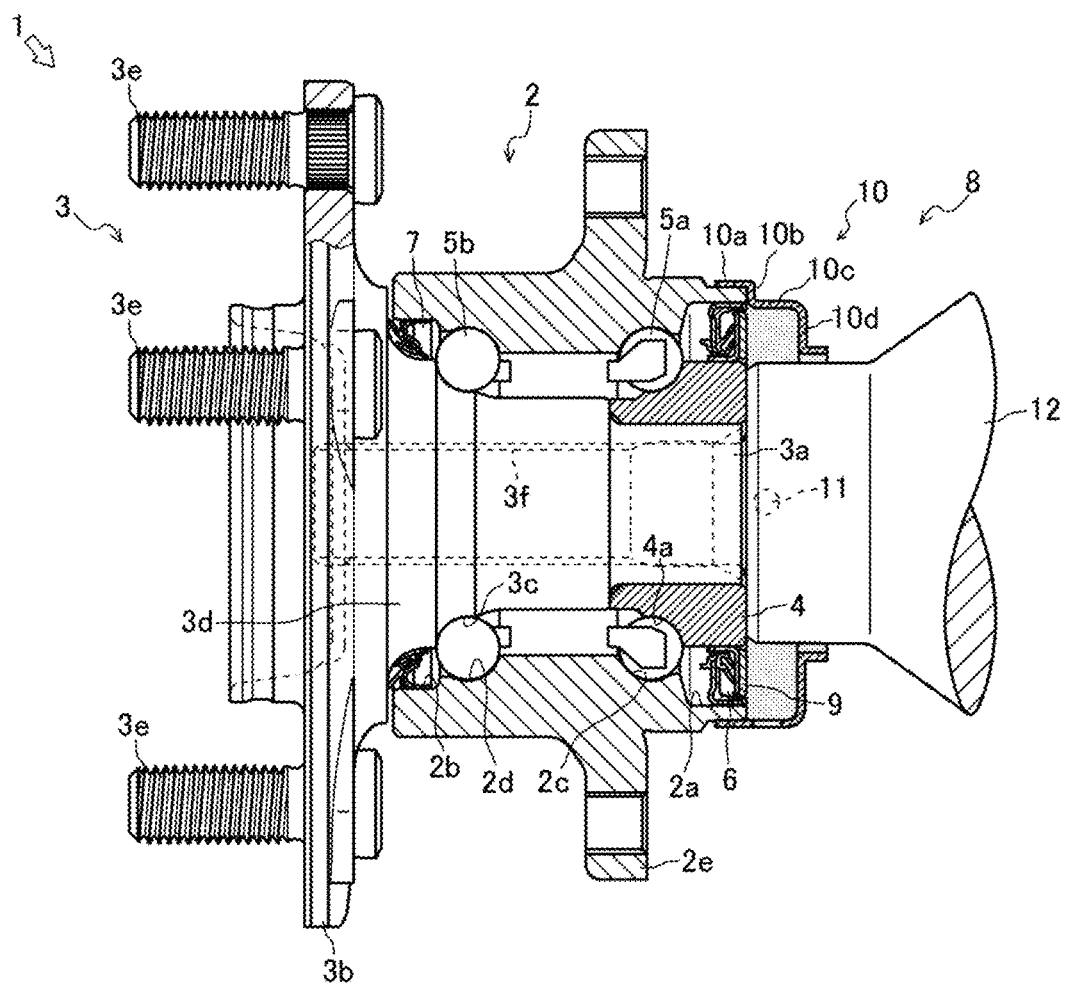
FIG. 2 is a sectional view showing the overall arrangement of the wheel bearing device according to the first embodiment of the present invention which incorporates a drive shaft.

As shown in FIGS. 1 and 2, the wheel bearing device 1 rotatably supports a wheel in a suspension device of a vehicle such as an automobile. The wheel bearing device 1 includes an outer race 2, a hub race 3, an inner race 4, an inner side ball row 5a as a rolling element row (see FIG. 2), an outer side ball row 5b (see FIG. 2), an inner side seal member 6 (see FIG. 2), an outer side seal member 7 (see FIG. 2), and a rotational speed detector 8. In this case, the inner side represents the vehicle body side of the wheel bearing device 1 when attached to the vehicle body, and the outer side represents the wheel side of the wheel bearing device 1 when attached to the vehicle body.

As shown in FIG. 2, the outer race 2 as an outer member supports the inner members (the hub race 3 and the inner race 4). The outer race 2 is made of medium to high carbon steel containing 0.40 wt % to 0.80 wt % carbon such as S53C formed into a substantially cylindrical shape. An inner side opening portion 2a in which the inner side seal member 6 can be fitted is formed in the inner side end portion of the outer race 2. An outer side opening portion 2b in which the outer side seal member 7 can be fitted is formed in the outer side end portion of the outer race 2.

An inner side outer raceway surface 2c and an outer side outer raceway surface 2d, each formed in an annular shape, are formed on the inner peripheral surface of the outer race 2 so as to be parallel to each other in the circumferential direction. The outer side outer raceway surface 2d is formed so as to be equal to or larger than the inner side outer raceway surface 2c in pitch circle diameter. A hardened layer having a surface hardness of 58 HRC to 64 HRC is formed on the inner side outer raceway surface 2c and the outer side outer raceway surface 2d by induction hardening. A vehicle body attaching flange 2e for attachment to the knuckle of a suspension device (not shown) is integrally formed on the outer peripheral surface of the outer race 2 near the inner side opening portion 2a. One side surface and the other side surface, which are attaching surfaces of the vehicle body attaching flange 2e, are subjected to machining such as cutting.

The hub race 3 constituting the inner member rotatably supports a wheel of a vehicle (not shown). The hub race 3 is made of medium to high carbon steel containing 0.40 wt % to 0.80 wt % carbon such as S53C formed into a cylindrical shape. At the inner side end portion of the hub race 3, a small-diameter stepped portion 3a reduced in diameter is formed on the outer peripheral surface. A wheel attaching flange 3b for attachment of a wheel is integrally formed on the outer side end portion of the hub race 3. An annular inner raceway surface 3c and an annular seal sliding surface 3d are formed on the outer peripheral surface of the hub race 3 which is located on the side of the wheel attaching flange 3b. The wheel attaching flange 3b is provided with hub bolts 3e at circumferentially equidistant positions. A serration 3f (or spline) for torque transmission is formed on the inner peripheral surface of the hub race 3.

The hub race 3 is subjected to hardening treatment in the surface hardness range of 58 HRC to 64 HRC by induction hardening from the inner side small-diameter stepped portion 3a to the outer side inner raceway surface 3c. With this treatment, the hub race 3 has sufficient mechanical strength against the rotational bending load added to the wheel attaching flange 3b, and the durability of the hub race 3 is improved. The hub race 3 is provided with an inner race 4 in the small-diameter stepped portion 3a. The hub race 3 is disposed such that the inner raceway surface 4a formed on the inner race 4 at the inner side end portion faces the inner side outer raceway surface 2c of the outer race 2, and the inner raceway surface 3c formed on the outer side faces the outer side outer raceway surface 2d of the outer race 2.

The inner race 4 gives a preload to the inner side ball row 5a that is a rolling row and arranged on the vehicle body side when mounted on the vehicle and the outer side ball row 5b arranged on the wheel side when mounted on the vehicle. The inner race 4 is formed in a cylindrical shape. The inner race 4 is made of a high carbon chromium bearing steel such as SUJ 2 and has been hardened in the range of 58 HRC to 64 HRC to the core portion by immersion quenching. On the outer peripheral surface of the inner race 4, an annular inner raceway surface 4a is formed in the circumferential direction. The inner race 4 is integrally fixed to the inner side end portion of the hub race 3 in a state where a predetermined preload is applied by press fitting. That is, on the inner side of the hub race 3, the inner race 4 constitutes the inner raceway surface 4a. The hub race 3 is disposed such that the inner raceway surface 4a formed on the inner race 4 at the inner side end portion faces the inner side outer raceway surface 2c of the outer race 2, and the inner raceway surface 3c formed on the outer side faces the outer side outer raceway surface 2d.

The inner side ball row 5a and the outer side ball row 5b, which are rolling rows, rotatably support the hub race 3. The inner side ball row 5a and the outer side ball row 5b have a plurality of balls serving as rolling elements annularly held by retainers. The inner side ball row 5a and the outer side ball row 5b are made of high carbon chromium bearing steel such as SUJ2 and have been hardened in the range of 58 HRC to 64 HRC to the core portion by immersion quenching. The inner side ball row 5a is rollably interposed between the inner raceway surface 4a formed on the inner race 4 and the inner side outer raceway surface 2c of the outer race 2 facing the inner raceway surface 4a. The outer side ball row 5b is rollably interposed between the inner raceway surface 3c formed on the hub race 3 and the outer side outer raceway surface 2d of the outer race 2 facing the inner raceway surface 3c. That is, the inner side ball row 5a and the outer side ball row 5b rotatably support the hub race 3 and the inner race 4 with respect to the outer race 2.

In the wheel bearing device 1, double-row angular ball bearings are configured by the outer race 2, the hub race 3, the inner race 4, the inner side ball row 5a, and the outer side ball row 5b. In this embodiment, the wheel bearing device 1 includes the double-row angular ball bearings. However, the present invention is not limited to this. The wheel bearing device 1 may include double-row tapered roller bearings or the like.

The inner side seal member 6 closes a gap between the inner side opening portion 2a of the outer race 2 and the hub race 3. The inner side seal member 6 includes a substantially cylindrical seal plate and a substantially cylindrical slinger having a collar at one-side end portion. The inner side seal member 6 is obtained by bonding a plurality of one-side seal lips made of synthetic rubber such as acrylonitrile-butadiene rubber (NBR) to a seal plate made of, for example, a ferritic stainless steel plate (SUS 430 series of JIS standards or the like) by cure adhesion. The slinger is made of a steel plate equivalent to the seal plate. The inner side seal member 6 has a seal plate fitted on the inner side opening portion 2a of the outer race 2, with a cylindrical portion of the slinger being fitted to the inner race 4, thereby forming a pack seal. The slinger is fixed to the inner race 4 such that its collar portion faces the outer side (inner side). A magnetic encoder 9 of the rotational speed detector 8 is bonded to the outer side (inner side) of the collar portion of the slinger. The inner side seal member 6 is configured so as to be slidable with respect to the slinger as the one-side seal lip of the seal plate comes into contact with the slinger through an oil film. With this arrangement, the inner side seal member 6 prevents leakage of lubricating grease from the inside of the outer race 2 and invasion of rainwater, dust, and the like from the outside.

The outer side seal member 7 closes a gap between the outer side opening portion 2b of the outer race 2 and the hub race 3. The outer side seal member 7 is integrally joined to a core bar obtained by forming a plurality of other-side seal lips made of a synthetic rubber into a substantially cylindrical shape by cure adhesion. The outer side seal member 7 has a cylindrical portion fitted on the outer side opening portion 2b of the outer race 2, with a plurality of other-side seal lips being in contact with the seal sliding surface 3d of the hub race 3. The outer side seal member 7 is configured so as to be slidable with respect to the hub race 3 as the other-side seal lip comes into contact with the seal sliding surface 3d of the hub race 3 through an oil film. With this arrangement, the outer side seal member 7 prevents leakage of lubricating grease from the inside of the outer race 2 and invasion of rainwater, dust, and the like from the outside.

As shown in FIG. 1 and FIG. 2, the rotational speed detector 8 detects the rotational speed of the hub race 3 and the inner race 4 around the axis. The rotational speed detector 8 is configured by the magnetic encoder 9, the cover 10 (gray portions in FIGS. 1 and 2), and a magnetic sensor 11.

The magnetic encoder 9 is obtained by forming synthetic rubber mixed with magnetic powder such as ferrite into an annular shape and magnetizing the resultant product to magnetic poles N and magnetic poles S at an equal pitch in the circumferential direction. The magnetic encoder 9 is integrally joined to the collar portion formed on the inner side end portion of the slinger constituting the seal member 6 by cure adhesion. That is, the magnetic encoder 9 is disposed in the inner side opening portion 2a of the outer race 2. Further, the magnetic encoder 9 is configured to be integrally rotatable with the hub race 3 and the inner race 4 through a slinger. The slinger is formed by press working using a ferromagnetic steel plate, for example, a ferritic stainless steel plate (SUS 430 series of the JIS standards) or cold rolled steel plate (SPCC series of the JIS standards) subjected to rust prevention treatment to improve rust prevention and the stability of detection accuracy.

The cover 10 protects the magnetic encoder 9 by closing the inner side opening portion 2a of the outer race 2. The cover 10 is made of, for example, a nonmagnetic austenitic stainless steel plate (SUS 304 series of the JIS standards or the like). The cover 10 is integrally formed in a substantially cylindrical shape by press working. The substantially cylindrical cover 10 includes a large-diameter cylindrical portion 10a, a stepped portion 10b, a small-diameter cylindrical portion 10c, and a collar portion 10d.

The inner diameter of the large-diameter cylindrical portion 10a is formed to have an outer diameter slightly smaller than the outer diameter of the inner side opening portion 2a of the outer race 2. As a result, the large-diameter cylindrical portion 10a is formed so as to be fittable on the inner side end of the outer race 2. The stepped portion 10b is formed so as to protrude radially inward from the inner side end of the large-diameter cylindrical portion 10a. That is, the stepped portion 10b is configured to be engageable with the inner side end face of the outer race 2 fitted in the large-diameter cylindrical portion 10a. The small-diameter cylindrical portion 10c projects in the axial direction from the inside of the stepped portion 10b and is formed into a substantially cylindrical shape. Accordingly, the small-diameter cylindrical portion 10c projects from the inner side end face of the outer race 2 and forms a space for the placement of the magnetic sensor 11 inside the cover 10. The collar portion 10d is formed to project radially inward from the inner side end of the small-diameter cylindrical portion 10c. With this arrangement, the collar portion 10d covers the magnetic encoder 9 in order to prevent erroneous detection caused by damage to the magnetic encoder 9 due to flying stones and the like and the adhesion of dirt, a magnetic substance, and the like. In this manner, the small-diameter cylindrical portion 10c of the cover 10 is connected to an end portion of the large-diameter cylindrical portion 10a through the stepped portion 10b. The inner side end of the outer race 2 is fitted to the large-diameter cylindrical portion 10a of the cover 10. Further, the position of the cover 10 relative to the outer race 2 is determined by bringing the inner side end face of the outer race 2 into contact with the stepped portion 10b. Accordingly, the cover 10 is provided at a predetermined position and protects the magnetic encoder 9 of the rotational speed detector 8 disposed near the inner side opening portion 2a.

As shown in FIG. 1, the magnetic sensor 11 contactlessly detects magnetism from the magnetic encoder 9. The magnetic sensor 11 includes a magnetic detection element for changing characteristics according to the flow direction of a magnetic flux of a Hall element, a magneto-resistive element (MR element), or the like, a detection unit incorporating an IC for adjusting the output waveform of the magnetic detection element, and signal and power lines. The magnetic sensor 11 is provided in the small-diameter cylindrical portion 10c of the cover 10 so that the detection unit faces the magnetic encoder 9. The magnetic sensor 11 alternately detects the transit time of each magnetism of the magnetic encoder 9 passing through the magnetism detection position (magnetic detection element) of the detection unit by integrally rotating with the hub race 3 and the inner race 4.

In the wheel bearing device 1 configured in this manner, double-row angular ball bearings are configured by the outer race 2, the hub race 3, the inner race 4, the inner side ball row 5a, and the outer side ball row 5b, and the hub race 3 is rotatably supported by the outer race 2 through the inner side ball row 5a and the outer side ball row 5b. Further, in the wheel bearing device 1, a gap between the inner side opening portion 2a of the outer race 2 and the inner race 4 is closed with the inner side seal member 6, and a gap between the outer side opening portion 2b of the outer race 2 and the hub race 3 is closed with the outer side seal member 7. With this arrangement, in the wheel bearing device 1, the hub race 3 supported by the outer race 2 is configured to be able to rotate while preventing the leakage of lubricating grease from the inside and the invasion of rainwater, dust, and the like from the outside. Further, in the wheel bearing device 1, the rotational speed detector 8 is configured by the magnetic encoder 9 provided for a slinger of the inner side seal member 6, the cover 10 provided on the outer race 2, and the magnetic sensor 11 provided on the cover 10. Accordingly, the wheel bearing device 1 is configured to detect the rotational speed of the hub race 3 and the inner race 4 by causing the magnetic sensor 11 fixed to the outer race 2 to detect a change in the magnetism of the magnetic encoder 9, which rotates integrally with the hub race 3 and the inner race 4. In the wheel bearing device 1, the outer race 2 which is an outer member is fixed to the vehicle body, and a torque transmission drive shaft 12 is fitted to the inner peripheral surface of the hub race 3 from one side end portion of the hub race 3. Although the wheel bearing device 1 configured as described above is a drive wheel, the wheel bearing device 1 may be a driven wheel. In this case, in the case of a drive wheel, because the cover 10 has a hole through which the drive shaft 12 passes, the inner side seal member 6 is required, whereas in the case of the driven wheel, because the wheel can be completely sealed with the cover, the inner side seal member 6 is not required.

The shape of the small-diameter cylindrical portion 10c of the cover 10 (the gray portion in FIGS. 3A to 4) will be described in detail next with reference to FIGS. 3A to 4.

Figure 3A:
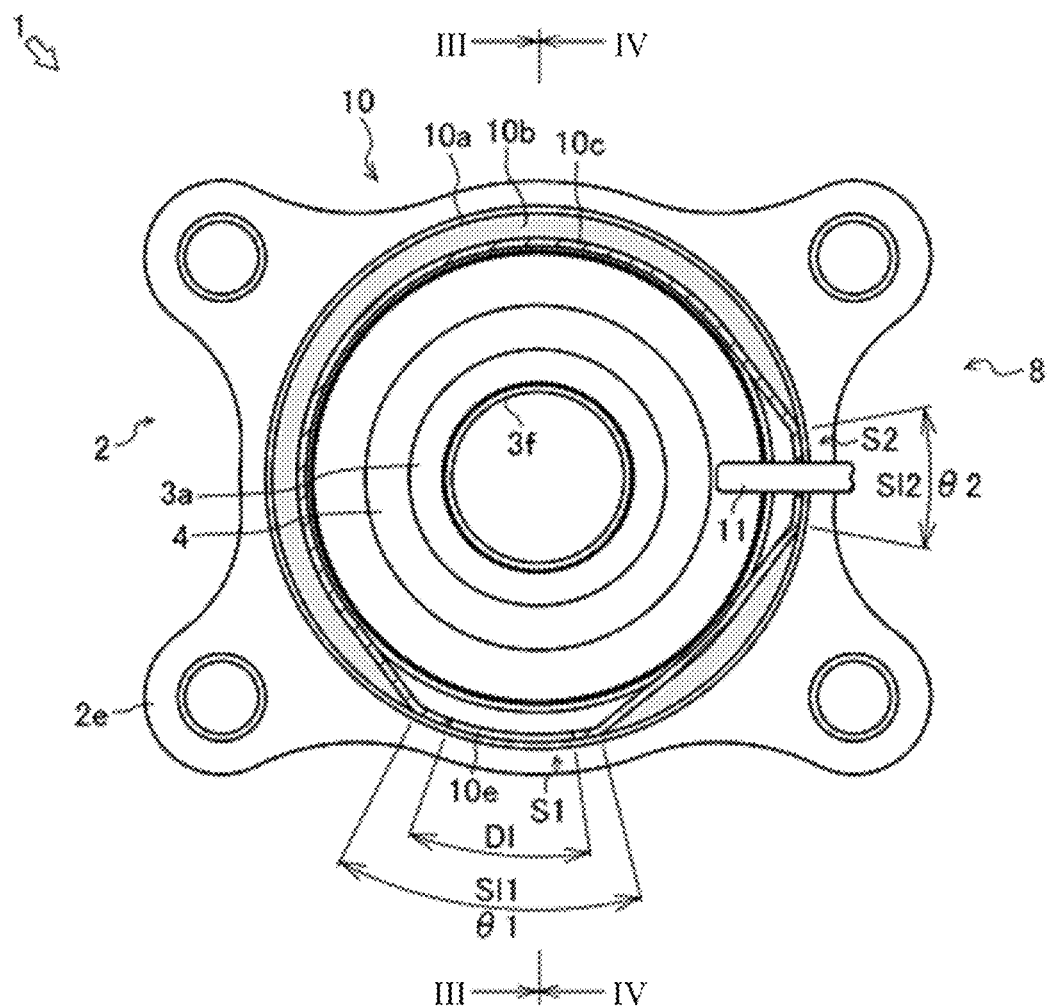
FIG. 3A is an axial sectional view of the cover of the wheel bearing device according to the first embodiment of present invention.

As shown in FIG. 3A, a part of the small-diameter cylindrical portion 10c of the cover 10 has two protruding circumferential surfaces S1 and S2 protruding outward in the radial direction. The protruding circumferential surfaces S1 and S2 are configured to protrude outward in the radial direction until the radius of the circular arc portion of the small-diameter cylindrical portion 10c which has a central angle θ1 and the radius of the circular arc portion of the small-diameter cylindrical portion 10c which has a central angle θ2 become equal to the radius of the large-diameter cylindrical portion 10a. In other words, the protruding circumferential surfaces S1 and S2 are formed such that a part of the small-diameter cylindrical portion 10c is disposed on the same curved surface as the large-diameter cylindrical portion 10a. With this arrangement, the cover 10 is configured as follows. The protruding circumferential surfaces S1 and S2 formed from circular arc portions of arbitrary central angles θ1 and θ2 are formed such that a part of the small-diameter cylindrical portion 10c and a part of the large-diameter cylindrical portion 10a are connected on the same curved surface without forming the stepped portion 10b in the range of circumferential projection lengths S11 and S12 of the protruding circumferential surfaces S1 and S2.

Figure 3B:
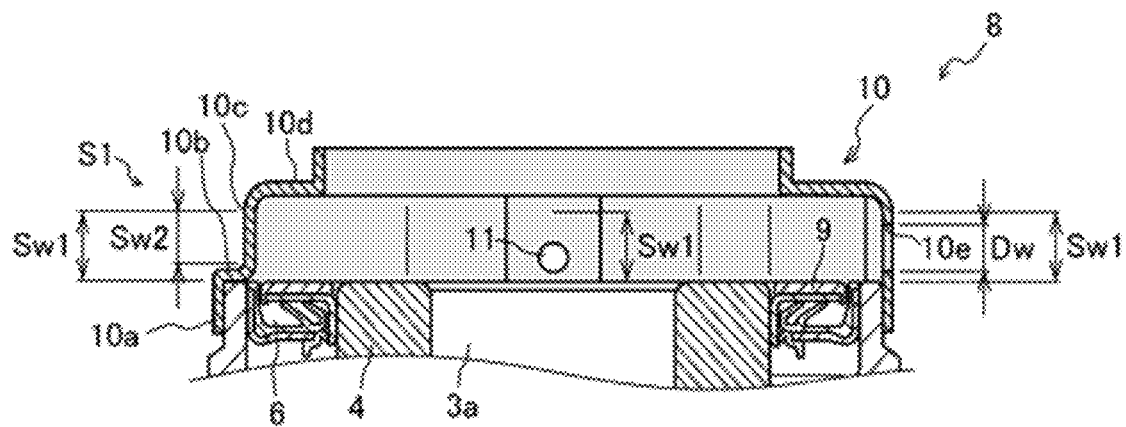
FIG. 3B is a sectional view of the cover taken along arrow III in FIG. 3A.
Figure 4:
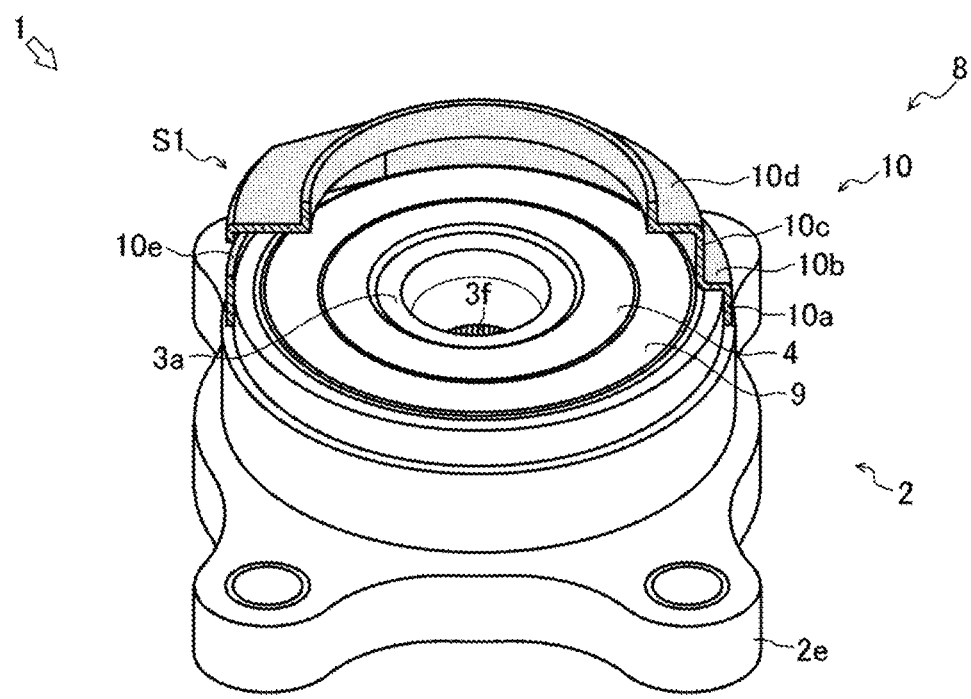
FIG. 4 is a perspective view of a cross-section of the cover taken along arrow IV in FIG. 3A.

As shown in FIGS. 3A to 4, a drain hole 10e for discharging foreign substances such as dust and dirt entering the inside of the cover 10 is formed in the protruding circumferential surface S1 of one of the two protruding circumferential surfaces S1 and S2 of the small-diameter cylindrical portion 10c. Because the cover 10 is fixed to the outer race 2 which is an outer member fixed to the vehicle body, the cover 10 does not always rotate. Accordingly, by providing the drain hole 10e in a portion of the cover 10 which is located on the ground side when the cover 10 is fixed to the vehicle body, foreign substances can be efficiently discharged by gravity.

As shown in FIG. 3A, the drain hole 10e is formed into a long hole at an arbitrary position so as to have a drain length D1 that is an arbitrary circumferential length in the range of the projection length S11 of the protruding circumferential surface S1.

As shown in FIG. 3B, the drain hole 10e is formed into a long hole at an arbitrary position so as to have a drain width Dw that is an arbitrary axial length in a range Sw1 from a position overlapping the inner side end of the outer race 2 to a collar-side bent portion for the connection of the collar portion 10d on the protruding circumferential surface S1. When the drain hole 10e is to be formed in a portion of the small-diameter cylindrical portion 10c other than the protruding circumferential surfaces S1 and S2, the drain hole 10e is formed in a range Sw2 obtained by excluding the thickness of the stepped portion 10b and a bent portion formed on the stepped portion side for the connection of the stepped portion 10b from the range Sw1 from the position overlapping the inner side end of the outer race 2 to the collar-side bent portion for the connection of the collar portion 10d. That is, the protruding circumferential surface S1 of the small-diameter cylindrical portion 10c which is sandwiched between the collar portion 10d and the large-diameter cylindrical portion 10a without formation of the stepped portion 10b has a wider range in which the drain hole 10e can be formed than a portion of the small-diameter cylindrical portion 10c other than the protruding circumferential surfaces S1 and S2 sandwiched between the stepped portion 10b and the collar portion 10d.

As shown in FIGS. 3A and 3B, the magnetic sensor 11 for detecting the magnetism of the magnetic encoder 9 is provided on the other protruding circumferential surface S2 of the two protruding circumferential surfaces S1 and S2 of the small-diameter cylindrical portion 10c. The magnetic sensor 11 is fixed at an arbitrary position located in the range of the protrusion length S12 of the protruding circumferential surface S2 and in the range Sw1 from the position overlapping the inner side end of the outer race 2 to the collar-side bent portion for the connection of the collar portion 10d. The magnetic sensor 11 is inserted in the cover 10 and provided so as to face the magnetic encoder 9.

In the wheel bearing device 1 configured in this manner, because the stepped portion 10b connecting the small-diameter cylindrical portion 10c and the large-diameter cylindrical portion 10a is not formed on the protruding circumferential surfaces S1 and S2 of the small-diameter cylindrical portion 10c of the cover 10, the axial width of the portion in which the drain hole 10e is formed is not limited by the stepped portion 10b. That is, the range Sw1 in the axial direction in which the drain hole 10e of the protruding circumferential surface S1, on which the stepped portion 10b is not formed, can be formed is larger than the range Sw2 in the axial direction in which the drain hole 10e in the portion of the small-diameter cylindrical portion 10c, on which the stepped portion 10b is formed, can be formed. In the wheel bearing device 1, a circular arc portion of an arbitrary central angle θ1 of the small-diameter cylindrical portion 10c is formed to protrude radially outward. That is, in the wheel bearing device 1, by setting the protrusion length S11 of the protruding circumferential surface S1 to be larger than the desired drain length D1, the drain hole 10e having the desired drain length D1 is formed at an arbitrary position in the range of the protrusion length S11 of the protruding circumferential surface S1. This can improve the foreign substance discharging property of the drain hole 10e of the wheel bearing device 1 without increasing the size of the cover 10 in the axial direction. Further, by forming the other protruding circumferential surface S2 of the wheel bearing device 1, the magnetic sensor 11 is disposed in a portion of the cover 10 which does not overlap the drain hole 10e. With this arrangement, the size of the cover 10 is not increased in the axial direction.

A wheel bearing device 13 as the second embodiment of the wheel bearing device according to the present invention will be described next with reference to FIGS. 5A and 5B. It is to be noted that the wheel bearing device 13 according to the following embodiment is applied in place of the wheel bearing device 1 shown in FIGS. 1 to 4, the terms, figure numbers, reference numerals and symbols used in the description of the wheel bearing device 1 are used to indicate the same components, and the same descriptions as those of the previously described embodiment will be omitted, and the differences will be mainly described.

Figure 5A:
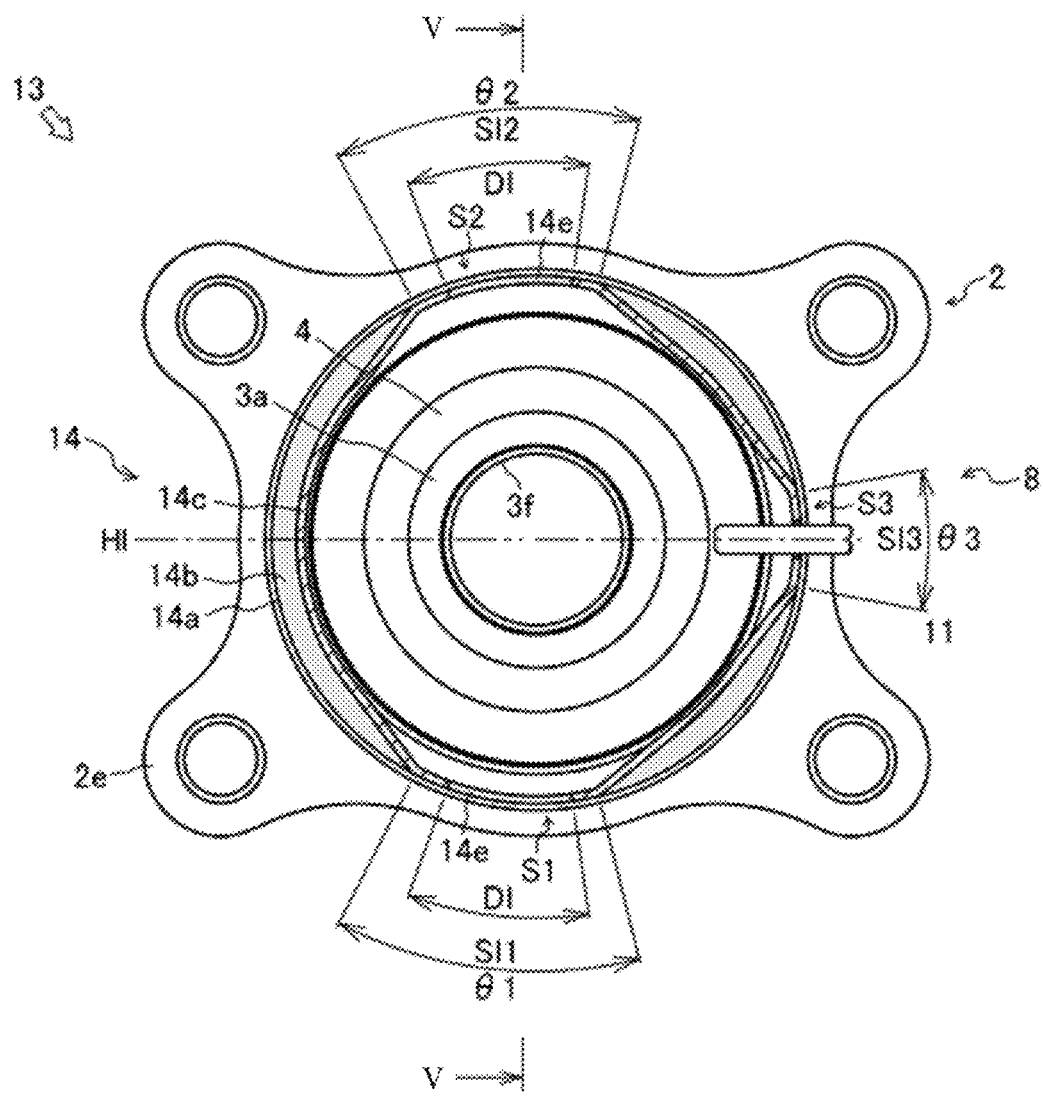
FIG. 5A is an axial sectional view of a cover of a wheel bearing device according to a second embodiment of the present invention.
Figure 5B:
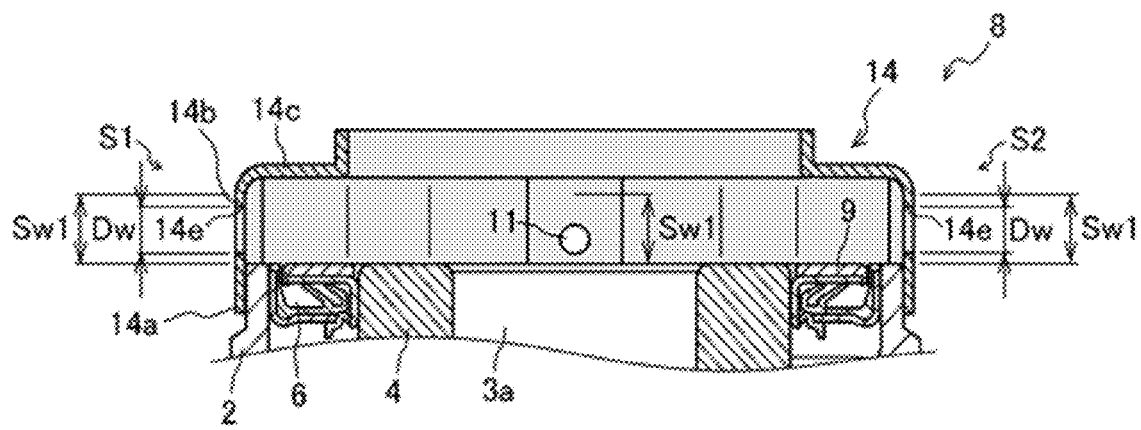
FIG. 5B is a sectional view of the cover taken along arrow V in FIG. 5A.

As shown in FIGS. 5A and 5B, a rotational speed detector 8 detects the rotational speed of a hub race 3 and an inner race 4 around the axis. The rotational speed detector 8 is configured by a magnetic encoder 9, a cover 14 (gray portions in FIGS. 5A and 5B), and a magnetic sensor 11.

As shown in FIG. 5A, a part of the small-diameter cylindrical portion 14c of the cover 14 has three protruding circumferential surfaces S1, S2, and S3 protruding outward in the radial direction. The two protruding circumferential surfaces S1 and S2 out of the three protruding circumferential surfaces S1, S2, and S3 are formed at corresponding upper and lower positions of the wheel bearing device 13 attached to the vehicle body. In other words, the two protruding circumferential surfaces S1 and S2 are formed at positions line symmetric with respect to a horizontal line H1 orthogonal to the axis of the cover 14 in the wheel bearing device 13 attached to the vehicle body. Further, among the three protruding circumferential surfaces S1, S2, S3, the protruding circumferential surface S3 other than the upper and lower protruding circumferential surface S1 and S2 is formed at an arbitrary position which does not overlap the protruding circumferential surfaces S1 and S2 arranged on the upper and lower sides of the wheel bearing device 13 attached to the vehicle body. The protruding circumferential surfaces S1, S2, and S3 are configured to protrude outward in the radial direction until the radius of each of circular arc portions having arbitrary central angles θ1, θ2, and θ3 becomes equal to the radius of a large-diameter cylindrical portion 14a.

Drain holes 14e for discharging foreign substances such as dust and dirt entering the inside of the cover 14 are formed in the protruding circumferential surfaces S1 and S2 of a small-diameter cylindrical portion 14c. The drain holes 14e are formed into long holes at arbitrary positions so as to have a drain length D1 that is an arbitrary circumferential length in the range of the projection length S11 of the protruding circumferential surface S1 and the range of the projection length S12 of the protruding circumferential surface S2.

As shown in FIG. 5B, the drain holes 14e are formed into long holes at arbitrary positions so as to have a drain width Dw that is an arbitrary axial length in a range Sw1 from a position overlapping the inner side end of the outer race 2 to a collar-side bent portion for connection of a collar portion 14d on the protruding circumferential surfaces S1 and S2.

As shown in FIGS. 5A and 5B, the magnetic sensor 11 for detecting the magnetism of the magnetic encoder 9 is provided on the protruding circumferential surface S3 other than the protruding circumferential surfaces S1 and S2 of the three protruding circumferential surfaces S1, S2, and S3 of the small-diameter cylindrical portion 14c. The magnetic sensor 11 is fixed at an arbitrary position located in the range of the protrusion length S13 of the protruding circumferential surface S3 and in the range Sw1 from the position overlapping the inner side end of the outer race 2 to the collar-side bent portion for the connection of the collar portion 14d. The magnetic sensor 11 has a detection unit inserted in the cover 14 and provided so as to face the magnetic encoder 9.

In the wheel bearing device 13 configured in this manner, the drain holes 14e are formed at arbitrary positions on the protruding circumferential surfaces S1 and S2 arranged so as to be line symmetric with respect to the horizontal line orthogonal to the axis of the cover 14, and the magnetic sensor 11 is disposed, thereby forming a right and left dual-purpose part. This can improve the foreign substance discharging property of the drain holes 14e without increasing the size of the cover 14 in the axial direction.

The wheel bearing devices 1 and 13 according to the embodiments each have been described as a wheel bearing device of a third generation structure in which the inner raceway surface 3c of the inner side ball row 5a is directly formed on the outer periphery of the hub race 3. However, the present invention is not limited to this. For example, each device may have the second generation structure of an inner race rotation type, with a pair of inner races 4 being press-fitted to a hub race 3. In addition, although the wheel bearing devices 1 and 13 have been described as being for drive wheels, the present invention is not limited to this. Each device may be configured for a driven wheel. The above-described embodiments merely show representative forms of the present invention, and various modifications can be made without departing from the gist of the present invention.

The invention claimed is:
1. A wheel bearing device comprising:
an outer member having a first outer raceway surface and a second outer raceway surface integrally formed on an inner periphery, the outer member being fixable to a vehicle body;
an inner member including a hub race that integrally has, on one end portion, a wheel attaching flange for attachment of a wheel and a small-diameter stepped portion extending in an axial direction from the wheel attaching flange, and at least one inner race that is press-fitted on the small-diameter stepped portion, the small-diameter stepped portion having a first inner raceway surface formed on an outer periphery so as to face the first outer raceway surface, the at least one inner race having a second inner raceway surface formed on an outer periphery so as to face the second outer raceway surface;

a first row of rolling elements rollably housed between the first inner raceway surface and the first outer raceway surface;

a second row of rolling elements rollably housed between the second inner raceway surface and the second outer raceway surface;

a magnetic encoder provided at an inner side end portion of the inner member;

a cylindrical cover fitted on an inner side opening portion of the outer member; and a magnetic sensor provided in the cover with a detection unit facing the magnetic encoder, wherein the cover includes a large-diameter cylindrical portion fitted on the outer member, a stepped portion protruding radially inward from an end of the large-diameter cylindrical portion and contacting an end face of the outer member, and a small-diameter cylindrical portion extending from the stepped portion in the axial direction, wherein a first portion of the small-diameter cylindrical portion, which is located on a ground side, protrudes radially outward so as to form a first protruding circumferential surface having a circular arc shape with a radius equal to a radius of the large-diameter cylindrical portion, and wherein a drain hole is formed in the first protruding circumferential surface.

2. The wheel bearing device according to claim 1, wherein the small-diameter cylindrical portion includes a second portion that protrudes radially outwardly and forms a second protruding circumferential surface on an upper side of the cover so as to oppose the first protruding circumferential surface, and the drain hole is formed in each of the first and second protruding circumferential surfaces.

3. The wheel bearing device according to claim 2, wherein the small-diameter cylindrical portion includes a third portion that protrudes radially outwardly and forms a third protruding circumferential surface.

4. The wheel bearing device according to claim 1, wherein the small-diameter cylindrical portion includes a second portion that protrudes radially outwardly and forms a second protruding circumferential surface, and the magnetic sensor is provided on the second protruding circumferential surface.

5. The wheel bearing device according to claim 1, wherein the first protruding circumferential surface is formed to have a predetermined width in a circumferential direction, and the drain hole is formed as an elongated hole extending in the circumferential direction.

* * * * *